May 3, 1960  C. S. PHELAN  2,934,971
CONTROL LINE REGULATOR
Filed Sept. 8, 1958  2 Sheets-Sheet 1
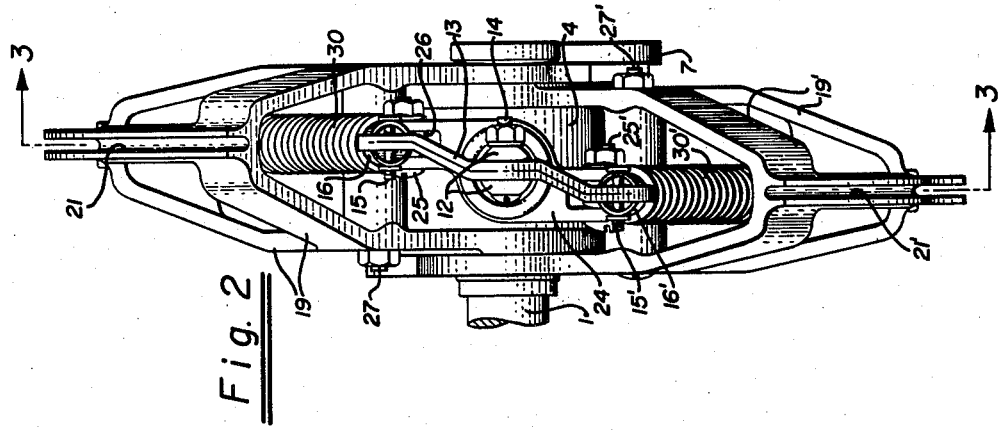
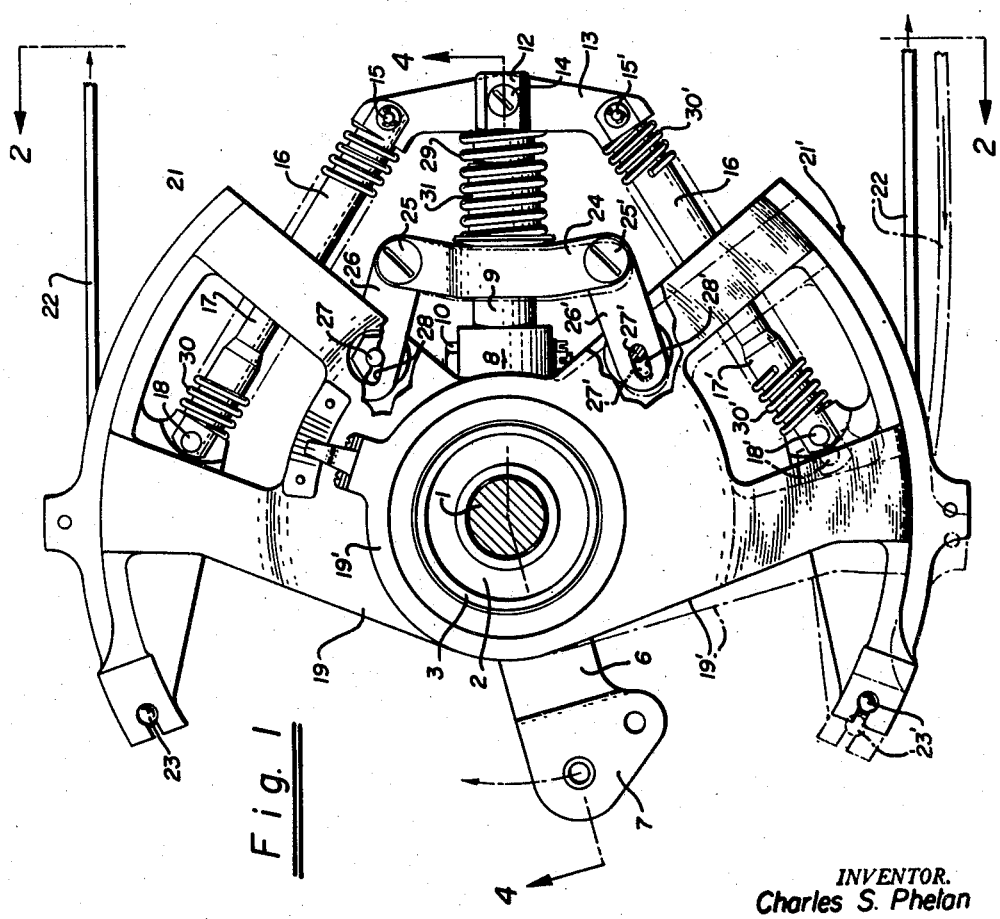
INVENTOR.
Charles S. Phelan
BY
Attorney

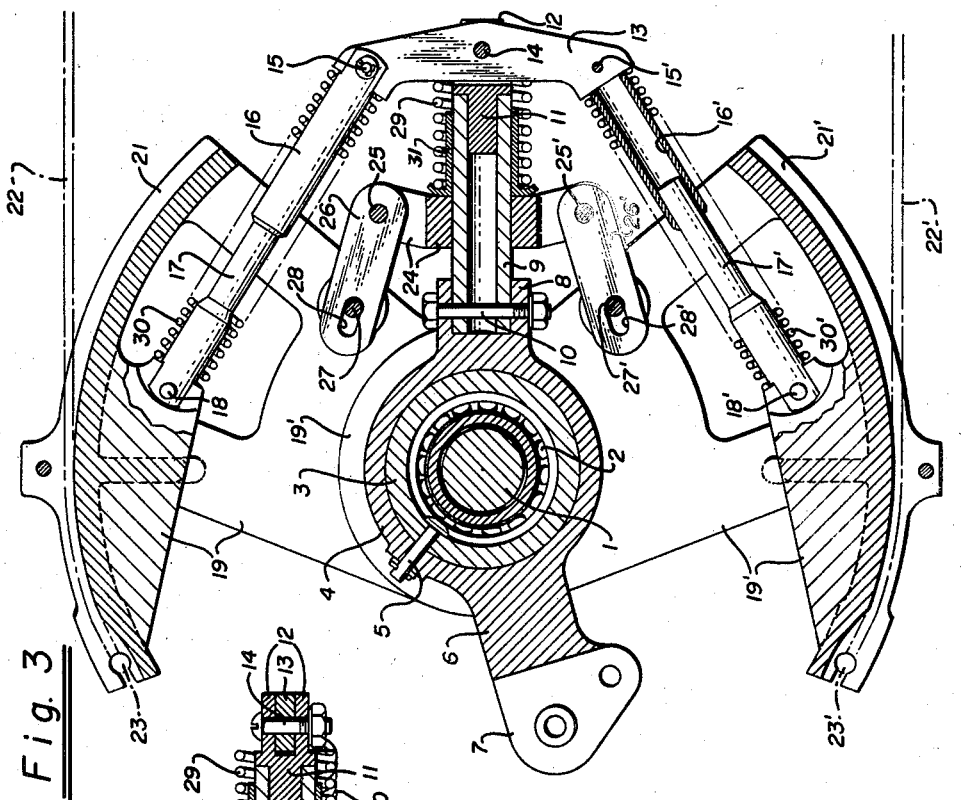

United States Patent Office 2,934,971
Patented May 3, 1960

2,934,971

CONTROL LINE REGULATOR

Charles S. Phelan, Tustin, Calif., assignor, by mesne assignments, to Pacific Scientific Company, San Francisco, Calif., a corporation of California Application September 8, 1958, Serial No. 759,610

7 Claims. (Cl. 74—501.5)

This invention relates, generally, to control line apparatus, and, more particularly, to a novel control line regulator also serving as a slack absorber during control operations.

As is well known, control line regulators are used for maintaining a uniform tension in control lines extending between controlling and controlled points such as in operating a controlled surface of an airplane, i.e., a rudder, aileron, elevator, etc., from the control stick or steering wheel, the said regulator acting automatically to compensate for variation in the length of the control lines during non-operating periods, which variation in control line length results from such conditions as temperature changes, airframe deflection, distortion, etc.

Control line regulators as heretofore constructed generally consist of one or more compression or regulator springs which exert a tension on the control lines or cables equal to the desired rig load of the cable system, together with an automatically locking mechanism which, although it allows the regulator spring forces to be exerted on the cables so long as the cables are substantially equal, thereby to maintain the desired rig loading, it nevertheless locks immediately upon a control force being applied to one of the control cables, thereby preventing further tension regulating movement and transmitting the control force to the controlled point for actuating a desired member without the controls becoming mushy.

In these control regulators heretofore used it often happens that the control force applied to one of the cables is great enough to cause such cable to stretch somewhat during the period the force is being applied. This causes undesired slack to be produced in the untensioned cable, resulting at times in the fouling of the control lines which prior art regulators were incapable of preventing.

In co-pending patent application, Serial Number 562,073, filed January 30, 1956, Clifford E. Cushman and Robert J. Wrighton, inventors, and in U.S. Patent Number 2,841,030, both assigned to the present assignee, there are disclosed certain types of control line regulators having means for taking up any slack that might develop in the untensioned cable during a control operation. The present invention discloses still another form of control line regulator embodying such means.

It therefore is the principal object of the present invention to provide a novel, improved control line regulator which is fast acting and dependable in operation, and which maintains the control lines taut at all times, even during periods of control operations, thereby preventing fouling of the control lines due to slack developing in the lines.

One feature of the present invention is to provide a novel control line regulator that uses regulator springs to serve two functions, namely to perform the regulating operation during non-motion transmitting periods of the system and to perform a slack take-up function during control movements of the system.

Another feature of the present invention is the provision of a novel spring structure for use in control line regulators for taking up slack in control lines occurring during periods when the regulator is being used to produce a control movement, the same spring structure serving to effect the regulating action of the regulator during non-operating periods of the regulator.

Still a further feature of the present invention is to provide a rugged, simply constructed regulator of the above character which will become more apparent from a perusal of the following specification taken in connection with the accompanying drawings wherein:

Fig. 1 is a view in side elevation, with parts broken away, of the novel regulator of the present invention, illustrating the operation of the same during a control movement thereof;

Fig. 2 is a plan view taken along line 2—2 of Fig. 1;

Fig. 3 is a sectional view taken along line 3—3 of Fig. 2, and shows the novel regulator in its regulating position;

Fig. 4 is a sectional view taken along line 4—4 of Fig. 1; and

Fig. 5 is a fragmentary view showing the position of the cross-head and sectors when the rig load is released from the cables.

Referring now to the drawings in detail, the reference numeral 1 designates a supporting shaft or bracket which serves to support the novel regulator upon the aircraft structure. Spaced ball bearings 2 and 2' have their inner races fixed upon the shaft 1 and carry a sleeve 3 upon their outer races to which sleeve is fixed a hub 4 as by a pin 5. Thus, the hub 4 is turnably mounted via bearings 2 and 2' upon the supporting shaft 1. The hub 4 is provided with a radially extending projection 6 having a bifurcated end 7 for attachment to a link or other connecting member for effecting actuation of a controlled member such as an elevator, rudder or other surface or member. The hub 4 is also provided with a tubular projection 8 within which is fixed the inner end portion of a hollow shaft or projection 9 as by a bolt 10. The hollow shaft 9 extends radially outwardly and has a pedestal 11 projecting into and secured within the outer hollow end of the shaft 9. The pedestal 11 has a bifurcated outer end portion 12 within which is pivoted the central portion of a rocker arm 13 as by use of a bolt 14. The outer ends of the rocker arm 13 are pivotally connected as by pins 15 and 15' to sleeve members 16 and 16' into which telescope the end portions of rods 17 and 17'. The free end of rod 17 is pivotally connected as by a pin 18 to a sector 19 that is turnably mounted as by bearings 20 upon the sleeve 3. A coil compression spring 30 surrounds the sleeve 16 and rod 17 and presses at one end against the rocker arm 13 and at its other end against the sector 21. The spring 30 tends to urge the sector 19 counter-clockwise about the sleeve 3, as viewed in Figs. 1 and 3.

The arcuate peripheral portion of the sector 19 is provided with a circumferential cable receiving groove 21 for receiving a regulator cable 22, the cable 22 having its end retained in the end portion of groove 21 as by a ball end 23 resting in a conforming socket in the sector 19.

Similarly, the end portion of rod 17' is pivotally connected as by pin 18' to an arcuate sector 19' that is turnably suported by bearings 20' upon the sleeve 3. The sleeve 16' and rod 17 are surrounded by a compression spring 30' tending to move the sector 19' clockwise about the sleeve 3, as viewed in Figs. 1 and 3. This sector is also provided with an arcuate circumferential groove 21' for receiving a regulator cable 22' therein, attached at 23' to an end portion of the sector.

A locking arm 24 is apertured in its central hub portion to receive the shaft 9, and normally slides along this shaft during regulating operations of the regulator, as will further appear. The outer ends of the locking arm 24 are bifurcated and are connected, as by bolts 25 and 25', through links 26 and 26', through bolts 27 and 27', to sectors 19 and 19' respectively. The links 26 and 26' are longitudinally slotted at 28 and 28' so that the bolts 27 and 27' will have a lost motion connection to the links 26 and 26'. A coil compression spring 29 surrounds the hollow shaft 9 and bears at its outer end against the underside of rocker arm 13 and at its other end against a bushing 31 abutting the locking arm 24.

When there is no regulating tension in the cables 22 and 22', the compressional forces of springs 30 and 30' respectively act to turn the sectors 19 and 19' in opposite directions about the sleeve 3 until the hub of locking arm or member 24 bottoms against the top of hub projection 8, as especially shown in Fig. 5, in which position of the locking arm the links 26 and 26', acting through bolts 27 and 27' engaging the outer ends of slots 28 and 28', serve to limit the motions of the sheave sectors 19 and 19'. As soon as regulating tension is applied to cables 22 and 22', the sectors 19 and 19' turn in opposite directions toward each other into an intermediate position depending upon the rig load. Such a position is shown in Fig. 3. In this position of the regulator, as the cables 22 and 22' lengthen and shorten as with temperature changes, etc., the coil compression springs 30 and 30' adjust themselves in length to accommodate such changes in cable length. During these regulating movements, the sectors 19 and 19' turn in opposite directions about their bearings on sleeve 3 and the locking arm 24 slides along the shaft 9 due to the fact that links 26 and 26' urge the ends of the locking arm 24 radially outwardly, the pins 27 and 27' seating in the inner ends of the slots 28 and 28' during such regulating action and moving with motion of the sectors 19 and 19'. The spring 29 at this time serves to oppose the radial outward movement of the locking arm 24 and links 26 and 26', causing links 26 and 26' to be pressed against pins 27 and 27' during the regulating period.

When a control force is applied to one of the cables, such as cable 22 for example, the stress in this cable will increase and that in cable 22' will decrease, so that a slight clockwise movement of sector 19 takes place, resulting in the tilting or rocking of the locking arm 24 upon shaft 9 as shown in dot-dash lines in Fig. 1. This will be apparent when it is noted that, as sector 19 tends to turn clockwise, it will actuate link 26 (see Fig. 1) to urge the left-hand end of the locking arm outwardly, while, at the same time, the decreasing tension in cable 22' will tend to permit spring 30' to urge sector 19' clockwise to permit link 26' to move inwardly, permitting the slight canting of locking arm 24 upon shaft 9, thereby binding or locking this locking arm upon the shaft 9. Thereafter, no further up and down movement of locking arm 24 takes place with respect to shaft 9, and, consequently, the force transmitting hub or member 4 becomes locked through shaft 9, locking arm 24 and link 26 to sector 19, so that movement of cable 22 due to a control motion will serve to turn the member 4 about bearings 2 and 2' and will also turn the radial projecting arm 6 to actuate the control surface connected to bifurcated end 7. Should cable 22' become slack, which often results particularly when a large control force is applied to cable 22, the spring 30' will act to turn the sector 19' clockwise as viewed in Fig. 3, to take up the slack, the slot 28' permitting bolt 27' to move in slot 28' as to the dot-dash position, enabling relative movement of the sector 19' with respect to link 26' to effect slack take-up, as is illustrated in Fig. 1 wherein the regulator is shown in locked position. Similarly, a pull upon cable 22' will serve to lock the locking arm member 24 upon shaft 9 and will permit spring 30 to take up any slack that may result in cable 22.

Thus it will be seen that the novel regulator of the present invention is of extremely simple construction and comprises essentially two sectors 19 and 19' to which the control cables are attached, a rocker arm 13 between which and the sectors the two compensating springs 30 and 30' react, not only to perform regulating operations of the regulator, but also to perform slack take-up of the regulator during control movements thereof. The locking arm is slidable along the same shaft that supports the rocker arm 13 and acts to lock the actuated sector to the hub 4, and hence to the control surface, as soon as a control motion is initiated thereby actuating the control surface, any slack resulting in the other cable being taken up by the regulating spring associated therewith.

Since many changes could be made in the above construction of the control line regulator and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control line regulator comprising a pair of oppositely disposed sectors relatively turnable about a common axis, said sectors being adapted to receive control cables for attachment thereto, a force transmitting member also turnable about said common axis and adapted to be connected for actuating a controlled member, compression springs respectively interposed between said force transmitting member and each of said sectors for urging the latter to turn in opposite directions to maintain the cables under rig tension, a locking member carried by said force transmitting member, and lost motion connections between said locking member and said sectors, said locking member being actuated by one of said lost motion connections to effect the locking of said sectors against relative turning movement when a control load is applied to one of the cables connected to one of said sectors, said compression springs not only serving normally to turn said sectors in opposite directions to effect regulating action of the regulator, but also serving to take up slack in the cables during control operations of the regulator.

2. A control line regulator as defined in claim 1, wherein said force transmitting member has an extension thereon and wherein said compression springs comprise a pair of coil springs betwen said force transmitting member extension and said sectors, said locking member comprising a locking bar slidable with respect to said force transmitting member extension and having links connecting the ends of the same respectively to said sectors, said locking member being adapted to bind upon said force transmitting member extension during control operations of the regulator.

3. In a control line regulator, a pair of oppositely disposed sectors turnable about a common axis and having arcuate perimeters for receiving control line cables for attachment thereto, a force transmitting member also turnable about said common axis adapted for connection to a controlled member to be actuated, said force transmitting member having a projection thereon, a locking member slidable on and movable along said projection and having portions extending outwardly from the sides of said projection, links connecting the outwardly extending portions of said locking member respectively to said respective sectors, a rocker arm carried by said projection, and compression springs interposed between the ends of said rocker arm and said sectors for urging said sectors to turn in opposite directions to maintain rig tension in the control line cables, a control movement of one of the control line cables serving to cause actuation of its connected sector and associated link to cause movement of said locking member to locked position, thereby effecting movement of said force transmitting member and actuation of the controlled member, the compression spring associated with the other sector serving to actuate the latter to eliminate any slack in the other cable.

4. In a control line regulator, a pair of oppositely disposed sectors turnable about a common axis and having arcuate perimeters for receiving control line cables for attachment thereto, a force transmitting member also turnable about said common axis and having a portion adapted for connection to a controlled member to be actuated, said force transmitting member having a projection thereon, a locking member movable and slidable along said projection, lost motion connections interposed between said locking member and said sectors, a rocker arm carried by said projection, and spring means comprising a pair of compression springs, a respective spring of said pair being interposed between a respective end portion of said rocker arm and said sectors for urging each of said sectors to turn in opposite directions to maintain rig tension in the control line cables, a control movement of one of the control line cables serving to cause actuation of its connected sector and associated lost motion connection resulting in movement of said locking member to locked position, thereby effecting movement of said force transmitting member and actuation of the controlled member, the compression spring associated with the other sector serving to actuate the latter to eliminate any slack in the other cable.

5. A control line regulator as defined in claim 4, wherein said lost motion connections comprise slotted links, said sectors having projections engaging in and slidable along the slot of said links.

6. A control line regulator as defined in claim 5 wherein spring means is interposed between said rocker arm and said locking member for taking up slack in the lost motion connection between said locking member and said sector during regulating action of said regulator.

7. A control line regulator comprising a pair of oppositely disposed sectors turnable about a common axis, said sectors being adapted to receive control cables, a force transmitting hub member also turnable about said axis for connection to a controlled member, said force transmitting hub member having a tubular extension thereon, a rocker arm pivoted on the end portion of said extension, compression springs respectively interposed between the ends of said rocker arm and said sectors for urging the latter to turn in opposite directions to maintain the cables under rig tension, a locking member slidable along said extension and extending to the opposite sides thereof, slotted links connecting the ends of said locking member to said respective sectors and compression spring means interposed between said locking member and said rocker arm, actuation of one of said control cables serving to move its sectors and effect slight turning and locking of said locking member through actuation of the slotted link connected to said sector, whereupon continued movement of the actuated control cable serves to effect actuation of said force transmitting hub member and movement of the controlled member, any slack developing in the unactuated cable being automatically eliminated during the control movement by expansion of the compression spring associated with its sector, the slotted link connection with said sector permitting such slack takeup movement.

References Cited in the file of this patent
UNITED STATES PATENTS

| | | |
|---|---|---|
| 2,585,358 | Weber | Feb. 12, 1952 |
| 2,787,916 | Cushman | Apr. 9, 1957 |
| 2,810,300 | Pigford | Oct. 22, 1957 |
| 2,841,030 | Wrighton | July 1, 1958 |